US011977569B2

(12) United States Patent
Potter et al.

(10) Patent No.: US 11,977,569 B2
(45) Date of Patent: May 7, 2024

(54) AUTONOMOUS OPEN SCHEMA CONSTRUCTION FROM UNSTRUCTURED TEXT

(71) Applicant: The United States of America, as represented by the Secretary of the Navy, Crane, IN (US)

(72) Inventors: Michael Lynn Potter, Fullerton, CA (US); Natalie Lynn Larson, Laguna Beach, CA (US); Amy Cheng, Irvine, CA (US); Hovanes Keseyan, Sherman Oaks, CA (US); Hanh Servin, Yorba Linda, CA (US)

(73) Assignee: The United States of America, Represented by the Secretary of the Navy, Washington, DC (US)

( * ) Notice: Subject to any disclaimer, the term of this patent is extended or adjusted under 35 U.S.C. 154(b) by 121 days.

(21) Appl. No.: 17/587,401

(22) Filed: Jan. 28, 2022

(65) Prior Publication Data

US 2022/0300544 A1 Sep. 22, 2022

Related U.S. Application Data

(60) Provisional application No. 63/143,085, filed on Jan. 29, 2021.

(51) Int. Cl.
*G06F 16/00* (2019.01)
*G06F 16/31* (2019.01)
(Continued)

(52) U.S. Cl.
CPC ........ *G06F 16/3334* (2019.01); *G06F 16/313* (2019.01); *G06F 16/35* (2019.01); *G06N 3/044* (2023.01)

(58) Field of Classification Search
CPC .... G06F 16/3334; G06F 16/313; G06F 16/35; G06N 3/044
(Continued)

(56) References Cited

U.S. PATENT DOCUMENTS 10,599,700 B2 * 3/2020 Davulcu .............. G06F 40/247
10,679,133 B1 * 6/2020 Mathur .................... G06N 5/02
(Continued)

OTHER PUBLICATIONS

Dimitris Papadopoulos et al.; "A methodology for Open Information Extraction and Representation from Large Scientific Corpora: The CORD-19 Data Exploration Use Case"; Appl. Sci. 2020, 10(16), 5630; https://doi.org/10.3390/app10165630; Aug. 13, 2020; 30 pages.*

(Continued)

*Primary Examiner* — Monica M Pyo
(74) *Attorney, Agent, or Firm* — Naval Surface Warfare Center, Crane Division; Patrick Law

(57) ABSTRACT

Disclosed is a natural language processing pipeline that analyzes and processes a corpus of textual data to automatically create a knowledge graph containing the corpus entities such as subjects and object and their relationships such as predicates or verbs. The pipeline is configured as an end-to-end neural Open Schema Construction pipeline having a coreference resolution module, an open information extraction (OIE) module, and an entity canonicalization module. The processed textual data is input to a graph database to create the knowledge graph displayable through a graphical user interface. In operation, the pipeline modules serve to create a single term for all entity mentions in the corpus that reference the same entity through coreference resolution, extract all subject-predicate-object triplets from the coreference resolved corpus through OIE, and then canonicalize the corpus by clustering each entity mention to a canonical form for mapping to the knowledge graph and display.

14 Claims, 12 Drawing Sheets

(51) Int. Cl.
   *G06F 16/33*      (2019.01)
   *G06F 16/35*      (2019.01)
   *G06N 3/044*      (2023.01)

(58) Field of Classification Search
   USPC ........................................................ 707/748
   See application file for complete search history.

(56)        References Cited

U.S. PATENT DOCUMENTS

| | | | |
|---|---|---|---|
| 10,824,815 B2 * | 11/2020 | Leibovitz | G06F 40/30 |
| 2004/0044519 A1 * | 3/2004 | Polanyi | G06F 40/35 |
| | | | 707/E17.058 |
| 2007/0179776 A1 * | 8/2007 | Segond | G06F 40/211 |
| | | | 707/E17.062 |
| 2013/0110842 A1 * | 5/2013 | Donneau-Golencer | |
| | | | G06F 16/337 |
| | | | 707/769 |
| 2017/0357625 A1 * | 12/2017 | Carpenter | G06F 40/289 |

OTHER PUBLICATIONS

Luis Galárraga; "Canonicalizing Open Knowledge Bases"; CIKM'14, Nov. 3-7, 2014, Shanghai, China; 11 pages.*
Larson, Natalie; Potter, Michael; Cheng, Amy; Keseyan, Hovanes; "NLP and Graph Databases", made public in Feb. 2020 in San Diego, CA.

* cited by examiner

[0|PAUL ALLEN] WAS BORN ON JANUARY 21, 1953, IN [1|SEATTLE, WASHINGTON,] TO KENNETH SAM ALLEN AND EDNA FAYE ALLEN, [0|ALLEN] ATTENDED [4|LAKESIDE SCHOOL, A PRIVATE SCHOOL IN [1|SEATTLE,]] WHERE [0|HE] BEFRIENDED [2|BILL GATES, TWO YEARS YOUNGER, WITH WHOM [0|HE] SHARED AN ENTHUSIASM FOR COMPUTERS], [3|[0|PAUL] AND [0|BILL]] USED A TELETYPE TERMINAL AT [4|[3|THEIR] HIGH SCHOOL, LAKESIDE,] TO DEVELOP [3|THEIR] PROGRAMMING SKILLS ON SEVERAL TIME-SHARING COMPUTER SYSTEMS.

- MICHAEL POTTER ATTENDS NORTHEASTERN UNIVERSITY. HE WORKS FOR THE DOD, WHILE ALSO ATTENDING THE UNIVERSITY OF LOS ANGELES.
- VAN NGUYEN IS A BRANCH HEAD.
- HANH SERVIN IS A BRANCH HEAD.
- POTTER RECEIVED A APPLE JOB OFFER.
- AR41 BRANCH AND AR42 BRANCH COLLABORATE ON PROJECTS.
- THE DOD IS A GOVERNMENT COMPANY. IT WORKS ON CLASSIFIED INFORMATION.
- AR41 BRANCH EVALUATES MISSILE READINESS.
- AR42 BRANCH EVALUATES CYBER SECURITY.
- LARSON EATS A LOT OF ICE CREAM.
- AR42 BRANCH HEAD VAN NGUYEN FINISHED PEM.
- ILKAY YILDIZ LIVES IN BOSTON. SHE GOES TO NORTHEASTERN UNIVERSITY, AND STUDIES ELECTRICAL ENGINEERING. SHE LOVES THE DOD.
- HANH SERVIN WORKS FOR THE DOD. SHE IS THE AR41 BRANCH SUPERVISOR.
- NATALIE LARSON LOVES WORKING AT THE DOD, AND IN HER FREE TIME SHE RUNS ULTRAS. SHE WORKS FOR THE AR41 BRANCH SUPERVISOR.
- AR41 BRANCH IS IN SERIOUS TROUBLE AGAIN.
- AR41 BRANCH HEAD HANH SERVIN FINISHED ERP.

900

AUTONOMOUS OPEN SCHEMA CONSTRUCTION FROM UNSTRUCTURED TEXT

CROSS-REFERENCE TO RELATED APPLICATIONS

The present application claims priority to U.S. Provisional Patent Application Ser. No. 63/143,085, filed Jan. 29, 2021, entitled "Autonomous Open Schema Construction from Unstructured Text (HaSe)," the disclosure of which is expressly incorporated by reference herein.

STATEMENT REGARDING FEDERALLY SPONSORED RESEARCH OR DEVELOPMENT

The invention described herein was made in the performance of official duties by employees of the Department of the Navy and may be manufactured, used and licensed by or for the United States Government for any governmental purpose without payment of any royalties thereon. This invention (Navy Case 210150US02) is assigned to the United States Government and is available for licensing for commercial purposes. Licensing and technical inquiries may be directed to the Technology Transfer Office, Naval Surface Warfare Center Corona, email: CRNA_CTO@navy.mil.

FIELD

The present invention relates to apparatus and methods for natural language processing (NLP) using an autonomous and/or automatic open schema construction (OSC) from unstructured text, and, more particularly, to an end-to-end neural OSC pipeline for converting unstructured text data into a structured knowledge graph.

BACKGROUND

In the field of computer science, and natural language processing (NLP), in particular, knowledge graphs or node-edge graphs representing entities and relationships are a burgeoning field of research. For example, Google's knowledge graph forms the backbone of its search engine, enabling Google to make intelligent inferences about results relevant to a user's query. Knowledge graphs are ubiquitous in a variety of cutting-edge NLP applications such as information retrieval, question-answering, salience determination, slot-filling, misinformation detection, and event schema induction. These applications enable advanced data analytics that allow users to derive new, meaningful insights about big data such as Navy missile standards documents, maintenance logs, failure reports, safety policy documents, and cybersecurity documents, as a few examples. Construction of a knowledge graph is central to these applications.

Furthermore, open schema construction (OSC) is the construction of a knowledge base or knowledge graph when properties of a knowledge graph are not specified by an ontology or domain specific model. Hand-crafted schemas defining domain specific properties are beneficial, but have limitations such as expert annotation requirements, incomplete property definitions, and inflexible model extractors. OSC, however, automatically discovers all predicates of interest, all noun-phrases referring to entity mentions, and is domain-agnostic. Accordingly, OSC enhances recall for better coverage of knowledge graph construction.

Known OSC solutions include semi end-to-end pipelines that have several differences from true OSC solutions. As an example, NOUS relies heavily on link prediction, the process of mapping nodes to existing entities in existing or available knowledge graphs or knowledge bases such as YAGO, YAGO2, Freebase, and Wikidata. Relying on existing knowledge graphs or bases limits the clarity of extracted information and introduces noise due to the non-domain specific information not being cleaned by entity canonicalization and coreference resolution (or being erased completely). As another example, Dream II provides for conflict detection in learned knowledge graphs and uses several domain-specific models such as FrameNet, WordNet, Semantex, and Unified Verb Index. Dream II, however, differs from true OSC knowledge graphs as each relation is a node with outgoing edges to its subject and object. Overall, known OSC solutions have at least a couple drawbacks. First, the underlying NLP algorithms rely on only grammar-based information. Additionally, the pre/post processing of the knowledge graph relies only on graph theory.

SUMMARY

The following presents a summary of one or more aspects of the present invention in order to provide a basic understanding of such aspects. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in a form that is a prelude to the more detailed description presented later.

According to an illustrative embodiment of the present disclosure, a method for processing textual data is disclosed. The method includes receiving a corpus of textual data from one or more documents or document sources. Further, the method includes analyzing the textual data using a pipeline that includes coreference resolution on the textual data to determine a single term for all of a number of entity mentions in the textual data that reference a same entity for each of a plurality of different entity mentions in the textual data. Further, the method includes performing open information extraction (OIE) based on the single terms generated by the coreference resolution to, in turn, generate one or more triplet representations of the textual data using one or more of first, second, and third OIE models, wherein each of the one or more triplet representations is associated with an entity and includes a subject, predicate, and object. Additionally, the method includes performing canonicalization of the one or more triplet representations using, in part, hierarchical agglomerative clustering (HAC) to identify one or more entity clusters based on each associated entity and to determine one or more canonicalized triplet representations.

According to another illustrative embodiment of the present disclosure, a natural language processing pipeline is disclosed. The pipeline includes a coreference resolution module configured to receive textual data, and perform coreference resolution on the textual data to determine a single term for all of a number of entity mentions in the textual data that reference a same entity for each of a plurality of different entity mentions in the textual data. Further, the pipeline includes an open information extraction (OIE) module configured to perform OIE based on the single terms generated by the coreference resolution module to generate one or more triplet representations of the textual data using one or more of first, second, and third OIE models, wherein each of the one or more triplet representations is associated with an entity and includes a subject, predicate, and object. Additionally, the pipeline includes a canonicalization module configured to perform canonicalization of the one or more triplet representations using, in part, hierarchical agglomerative clustering (HAC) to identify one or more entity clusters based on each associated entity and to determine one or more canonicalized triplet representations.

These and other aspects of the disclosure will become more fully understood upon a review of the detailed description, which follows. Other aspects, features, and embodiments of the present disclosure will become apparent to those of ordinary skill in the art, upon reviewing the following description of specific, example embodiments of the present disclosure in conjunction with the accompanying figures. While features of the present disclosure may be discussed relative to certain embodiments and figures below, all embodiments of the present disclosure can include one or more of the advantageous features discussed herein. In other words, while one or more embodiments may be discussed as having certain advantageous features, one or more of such features may also be used in accordance with the various embodiments of the disclosure discussed herein. In similar fashion, while example embodiments may be discussed below as device, system, or method embodiments it should be understood that such example embodiments can be implemented in various devices, systems, and methods.

BRIEF DESCRIPTION OF THE DRAWINGS

The detailed description particularly refers to the accompanying figures in which:

FIG. 3 shows an illustration of an example of an end-to-end coreference resolution output using the architecture and attendant method of FIG. 2.

FIG. 9 shows an illustration of a test sample of a corpus of textual data according to an example.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form to avoid obscuring such concepts.

The present disclosure provides a natural language processing (NLP) pipeline effectuating an open schema construction (OSC) capable of ingesting a textual corpus and automatically and/or autonomously creating a knowledge graph containing the corpus entities (e.g., nouns or pronouns) and relationship (e.g., verbs or predicates). The disclosed NLP pipeline provides a state-of-the-art (SOTA) tool for interactive and autonomous/automatic OSC from unstructured text to provide an interactive knowledge graph usable for downstream data tasks. Thus, the OSC brings together knowledge garnered automatically/autonomously from a set of documents and makes that knowledge analyzable. Autonomous/automatic OSC may be used in applications such as information retrieval, question-answering, salience determination, slot-filling, misinformation detection, and event schema induction on Department of Defense (DoD) data such as missile standards documents, maintenance logs, failure reports, safety policy documents, cybersecurity documents, and drift study documents.

Figure 1:
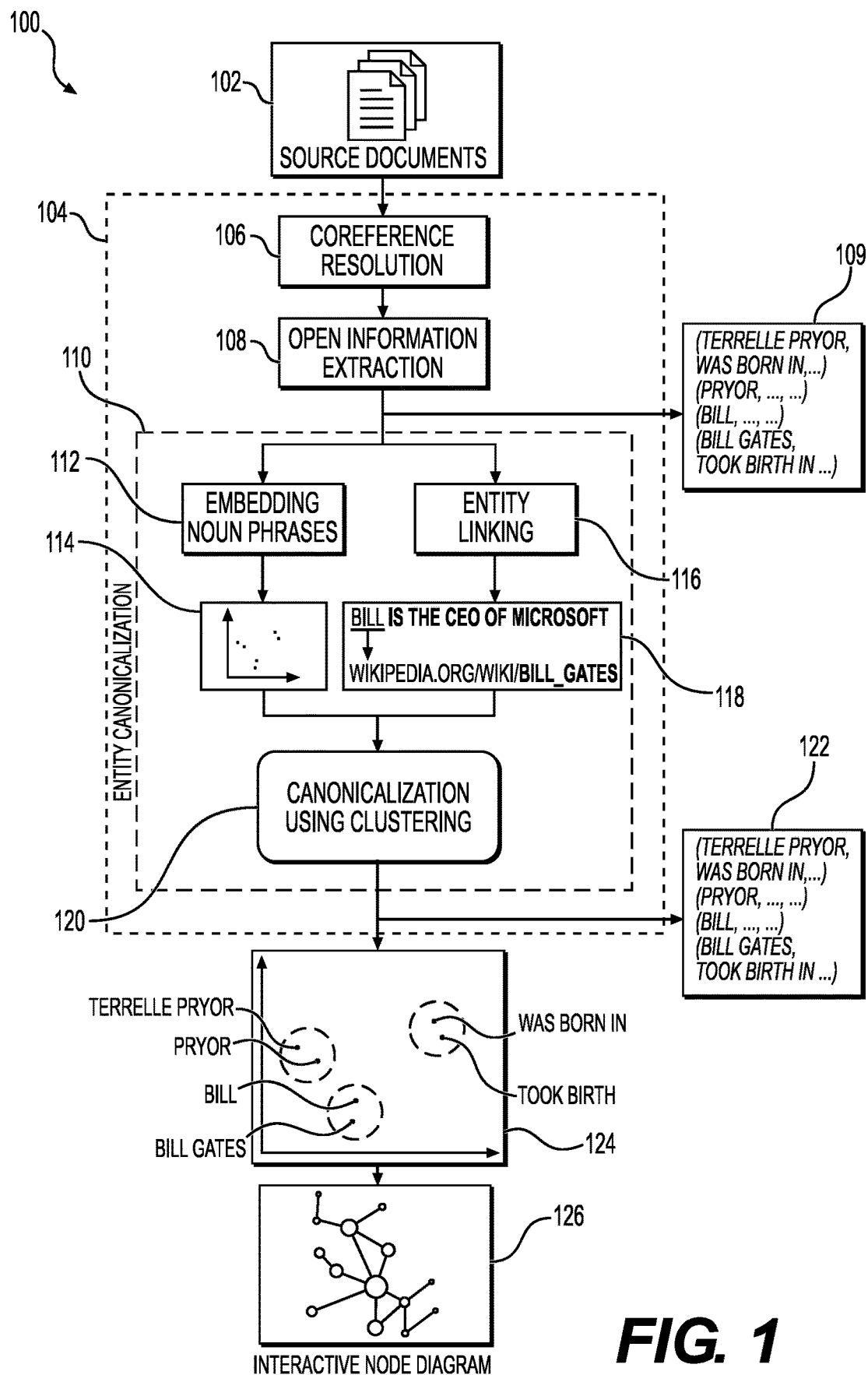
FIG. 1 shows a block diagram of an exemplary natural language processing (NLP) pipeline according to some aspects.

The disclosed pipeline (also referred to with the moniker "HaSe") is a modular deep learning-based end-to-end pipeline for automatic OSC, which is illustrated in FIG. 1, which is discussed below. The pipeline includes three main computations: coreference resolution, open information extraction (OIE), and entity canonicalization. Coreference resolution pre-processes text documents to provide for non-ambiguous entity mentions, Open Information Extraction extracts all factual information in the form of subject-predicate-object or subject-verb-object triplets, and Entity Canonicalization serves to reduce redundancy in the resulting triplets by identifying subjects and objects that refer to the same entity, respectively.

After processing with the three main computations, the textual data may be mapped to Knowledge Graphs, which are key for many problem-solving applications. Thus, the ability to autonomously or automatically create reliable Knowledge Graphs is beneficial. The disclosed deep learning-oriented, end-to-end Knowledge Graph extraction pipeline provides a domain-agnostic, open-source pipeline that runs in real-time and provides an intelligent analytical tool for converting unstructured text data into a structured Knowledge Graph.

As shown in FIG. 1, the pipeline system 100 includes ingesting or receiving a corpus of textual data 102. This corpus of textual data 102 may be received via any number of various means such as retrieval from databases, internet, intranet, and/or telecommunications transmissions. Once ingested or received, the textual data 102 is input to the NLP pipeline 104.

As discussed before, the pipeline 104 implements neural and grammar-based open information extraction models for predicate discovery, entity canonicalization, neural coreference resolution, custom word and entity embeddings, neural entity linking, and a graph database (e.g., Neo4j). Furthermore, the pipeline provides all of its fundamental functionalities accessible via a user-friendly graphical user interface (GUI).

Within the pipeline 104, the input textual data 102 is first input to a coreference resolution module or network 106. As will be discussed in more detail later, the coreference resolution module 106 pre-processes the textual data to create a single term for all mentions of an entity. That is, the coreference resolution module 106 is configured to determine which expressions refer to the same entities within each document and then resolves the expressions. For example, if the raw textual data includes the following text "Hanh works for the Department of Defense. She is the AR41 Branch Supervisor," the coreference resolution module 106 will resolve the preposition "She" that is used in place of the name Hanh such that the expressions all use a same single entity (e.g., Hanh) and the text becomes "Hanh works for the Department of Defense. Hanh is the AR41 Branch Supervisor." In some aspects, the coreference resolution module 106 comprises an end-to-end neural coreference resolution architecture, which is discussed in more detail later with respect to FIG. 2, a specialized processor circuitry configured to effect the functions of module 106, or equivalents thereof.

Further, the pipeline 104 includes an open information extraction (OIE) module 108 configured to extract all factual information from the pre-processed results of the coreference resolution module 106 in the form of subject-predicate-object or subject-verb-object triplets, the output of which is shown representationally at block 109. As an example based on the example before, the OIE module 108 will take the pre-processed text "Hanh works for the Department of Defense. Hanh is the AR41 Branch Supervisor," and identify triplets such as "Hanh—works for—Department of Defense." As will be discussed later in connection with FIG. 4, the OIE module 108 may be configured to employ one or more OIE models, and in some cases executing three different OIE models where the triplet results from each of the three OIE models are then joined or merged. In an aspect, the OIE module 108 is configured to employ one or more of a recurrent neural network, grammar based open information extraction models, and/or OpenIE, which will be discussed in more detail later with respect to FIGS. 3-5. Additionally, the module 108 may be implemented using specialized processor circuitry configured to effect the functions of module 108, or equivalents thereof.

As shown in FIG. 1, the pipeline 104 further includes an entity canonicalization module 110 configured to preform canonicalization using the triplets from OIE module 108 in order to create one form for entities across multiple documents in the corpus of textual data 102. As a result, the entity canonicalization module 110 enables the pipeline 104 to create a single node for each subject or object for graphing in a knowledge graph. As shown, the entity canonicalization module 110 may include an embedding noun phrases module 112, which serves to identify mentions of noun phrases (shown representationally by graph 114). Further, the entity canonicalization module 110 may include an entity linking module 116, which serves to link mentions of noun phrases to external sources (e.g., internet addresses or URLs such as is shown representationally by block 118 linking "Bill" with a Wikipedia entry for Bill Gates). Furthermore, the entity canonicalization module 110 may include a clustering module 120, which is configured to canonicalize the processed textual data (e.g., entity mentions) from modules 112 and/or 116 to identify entity clusters where entities are provided by open information extraction triplets as illustrated by block 122 and graph 124. In an aspect, the entity canonicalization performed by module 120 may be achieved using hierarchical clustering that maps each entity mention to a canonical form.

In an example of the operation of the entity canonicalization module 110 based on the examples above, one form is created for entities across documents, making a single node for each subject. For example, the triplets "Hanh—works for—DoD. Hanh Servin—is—branch supervisor," would become "Hanh Servin—works for—DoD. Hanh Servin—is—branch supervisor."

After canonicalization is performed, the clustered subject-predicate-object triplets may be stored and used to create an interactive knowledge graph from the extracted subject-predicate-object triplets (such as the exemplary knowledge graph display shown in FIG. 10, which will be discussed in more detail later). The interactive, web-based graph visualization may be created using any of a number of various graphing databases and tools, such as Neo4j and the JavaScript neovis.js library. Additionally, in some aspects a Python Neo4j wrapper API may be used for providing a list of predefined search functionalities on the Neo4j graph database. These predefined API functions include, but are not limited to, keyword search, accessing nodes that are several edges away from a given node, knowledge graph subset extraction based on query entities and query relationships, topic related search, and link prediction.

The entity linking may then map each canonicalized entity to an existing entity in a pre-constructed knowledge base such as Wikidata. The post-processed subject-predicate object triplets that are realized by module 110 are then loaded into a Graph Database (e.g., Neo4j) for constructing a Knowledge Graph. The Graph Database is accessible through a graphical user interface (GUI) to provide the user with an interactive and query-able medium as illustrated by block 126, which represents an interactive node diagram displaying the Knowledge Graph.

It is noted that, while not shown in FIG. 1, the system 100 may be implemented within or along with the graphical user interface (GUI), as will be discussed in more detail later. It is noted that the GUI may be configured to allow selectability and configurability for both the operation of one or more of the pipeline modules of pipeline 104 including turning the extractor module functions on and off and selecting thresholds for the number of subjects and objects. The GUI may further be configured to afford selectability and configurability for graphing functions for displaying the Knowledge Graph including merging subject nodes and/or object nodes, or merging edges (i.e., edges being the connections of nodes, and which correspond to verbs or predicates).

Concerning the functions of the various modules 106, 108, and 110 in pipeline 104, the following description of FIGS. 2-6 provides further details of the operations of these modules.

First with respect to the coreference resolution module 106, it is noted that coreference resolution identifies all expressions that refer to the same entity in a text. In one example, an end-to-end Neural Coreference Resolution architecture by AllenNLP (or equivalents) may be utilized, in which SpanBERT (or equivalents) may be used to extract word embeddings instead of GloVe, for example. The coreference resolution architecture extracts all possible consecutive sets of words (i.e. spans) in a document as potential mentions. Given all spans, the coreference resolution module 106 may learn a distribution over possible antecedents for each mention span.

Figure 2:
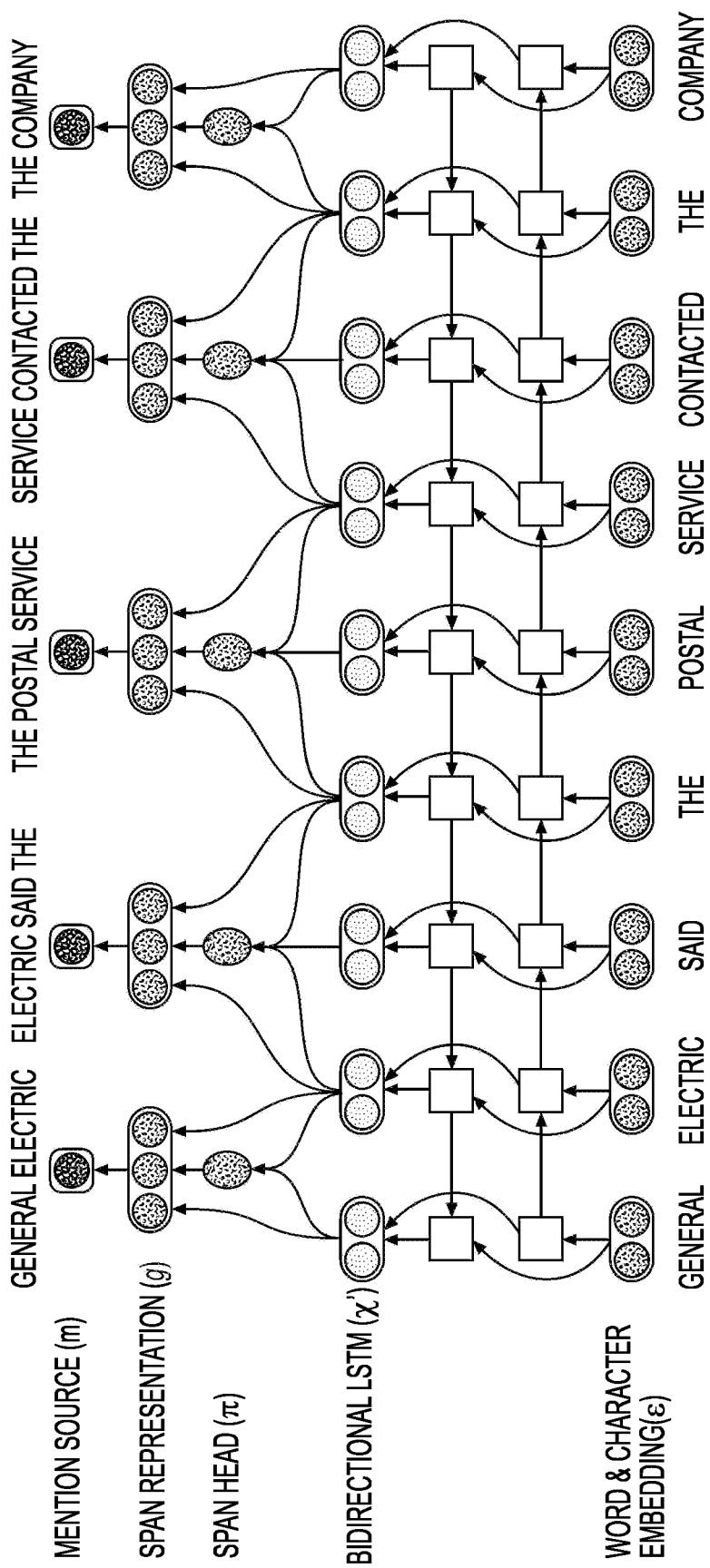
FIG. 2 shows an illustration of an end-to-end coreference architecture that may be utilized in the pipeline in FIG. 1 to effectuate a resolution method according to some aspects.

FIG. 2 shows an illustration of an end-to-end coreference architecture 200 that may be utilized in the pipeline in FIG. 1 to effectuate a resolution method according to some aspects. The coreference resolution architecture depicted in FIG. 2 consists of SpanBERT, a bidirectional Long-Short-Term Memory (LSTM) recurrent neural network, an attention mechanism over words in each span, and finally, a scoring function for each span that indicates the relevance of the span to an antecedent.

According to some aspects, the SpanBERT architecture extracts a numerical embedding vector $x_t$ for each word t in a vocabulary. The bidirectional LSTM extracts all mention spans in a document and computes a context vector for each word in each span. Particularly, the context vector is the concatenation of forward and backward direction hidden states $x_t^* = [h_{t,1}, h_{t,-1}]$, where −1 and 1 represent backward and forward directions, respectively.

The attention mechanism determines a word that best characterizes the syntactic category of a span, termed as syntactic headedness of the span. To do so, the attention mechanism computes a probability distribution $\alpha_{i,t}$ over each word t in a span i. This is followed by computing a representation $\hat{x}_i$ as an expectation of the word vectors $x_t$ in the span over the attention probability distribution $\alpha_{i,t}$ where:

$$\alpha_t = w_\alpha \cdot FFNN_\alpha(x_t^*); \quad (1)$$

$$\alpha_{i,t} = \frac{\exp(\alpha_t)}{\sum_{k=START(i)}^{END(i)} \exp(\alpha_k)}; \text{ and} \quad (2)$$

$$\hat{x}_i = \sum_{t=START(i)}^{END(i)} \alpha_{i,t} \cdot x_t. \quad (3)$$

Finally, the scoring function computes two sets of scores: (i) a unary score $s_m(i)$ for each span i for being a mention, and (ii) a pairwise antecedent score $s_a(i,j)$ denoting if mention span j is an antecedent of mention span according to the following relationships:

$$g_i = [x^*_{START(i)}, x^*_{END(i)}, \hat{x}_i] \quad (4)$$

$$s_m(i) = w_m \cdot FFNN_m(g_i) \quad (5)$$

$$s_a(i,j) = w_a \cdot FFNN_a([g_i, g_j, g_i \circ g_j]) \quad (6)$$

Given a document D, the overall coreference resolution architecture is trained end-to-end by maximizing the probability of assigning each span i to its correct antecedent $y_i$. Each antecedent assignment to a mentioned span is modeled as a multinoulli distribution and is independent of other spans as set forth in the following equations:

$$P(y_1, \ldots, y_N | D) = \prod_{i=1}^{N} P(y_i | D) \quad (7)$$

$$= \prod_{i=1}^{N} \frac{\exp(s_a(i, y_i))}{\sum_{y' \in \eta(i)} \exp(s(i, y'))} \quad (8)$$

where $\eta(i)$ is the set of all possible antecedent assignments for span i.

FIG. 3 illustrates an example 300 of coreference resolution clustering of a single document according to some aspects. Here, after training, each span is replaced with its most probable antecedent span, i.e. its correct antecedent. Then, each antecedent with its respective matching spans forms a coreference cluster. As may be seen, mentions of a first subject Paul Allen (marked 0) including pronouns is determined, as well as an object Seattle (marked 1), another subject Bill Gates (marked 2), and groupings of subjects "Bill and Paul" and pronouns (marked 3), and so forth.

Concerning the open information extraction module 108, the pipeline 104 may employ one or more OIE models. In one example, the pipeline 104 may employ three open information extraction models including: (1) recurrent neural network OIE (RNNOIE), OpenIE 5.1, and Stanford Core-NLP (or equivalents thereof), and also provides for the joining or union of subject-verb-object or subject-predicate-object triplets extracted by all three models.

Figure 4:
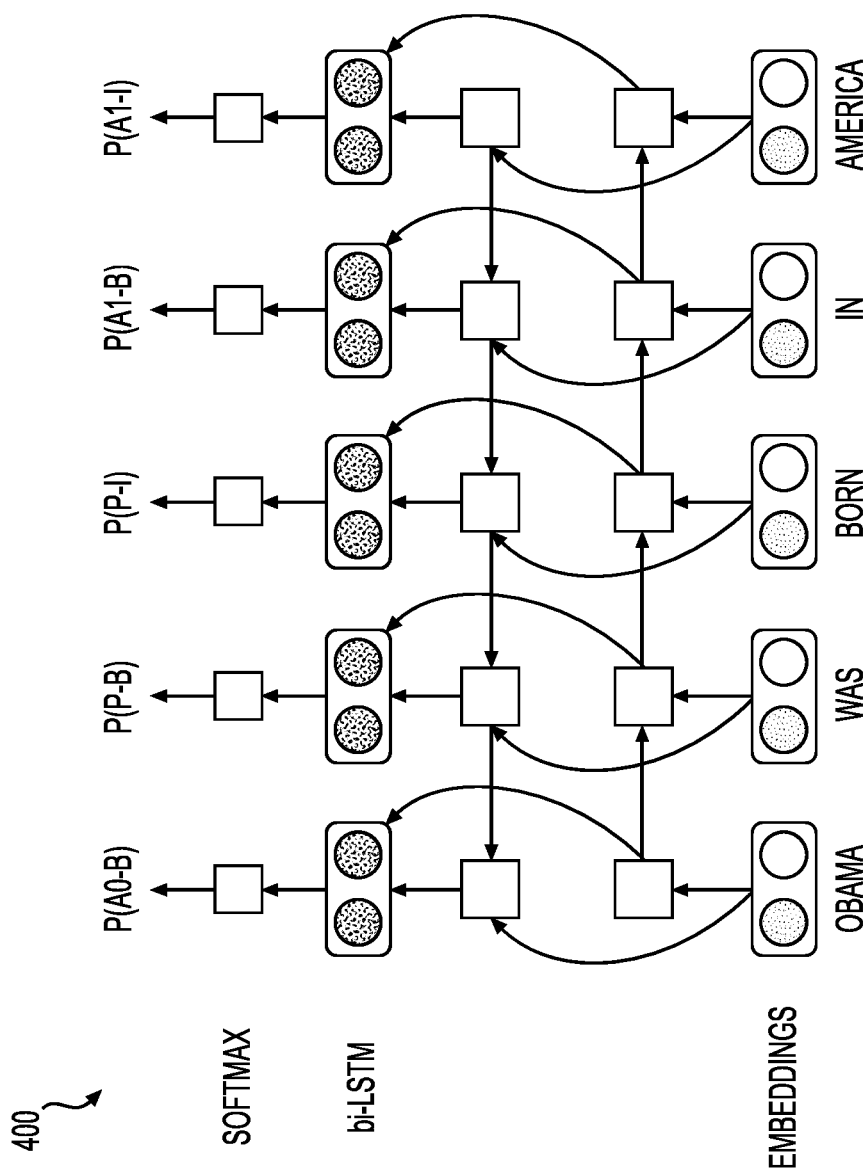
FIG. 4 shows an illustration of an RNNOIE implementation according to an example.

FIG. 4 illustrates an example 400 of RNNOIE, which is a supervised bidirectional long short-term memory (LSTM) that extends previous Semantic Role Labeling (SRL) models for open information triplet extraction. RNNOIE uses sentences and words that indicate the syntactic head of each predicate as inputs. Particularly, sentence words, syntactic head words, and respective parts-of-speech (POS) tags are concatenated and given as inputs to the LSTM. For each word in the sentence, a Beginning-Inside-Outside (BIO) tag is predicted as output, which are then rearranged into the triplet format subject-predicate-object. The B-prefix indicates that a word is the beginning of an entity mention, the I-prefix indicates that a word is inside the entity mention, and the O-prefix indicates that a word does not belong to the entity mention. The LSTM is then trained by minimizing the cross-entropy loss between true and predicted BIO tags. BIO tags include O, A1-I, A2-I, P-B, A0-B, A1-B or a small percent of miscellaneous tags, where Ai and P-i are the subjects/objects and the predicates, respectively, and these BIO-tags are rearranged into the triplet format subject-predicate-object.

Figure 5:
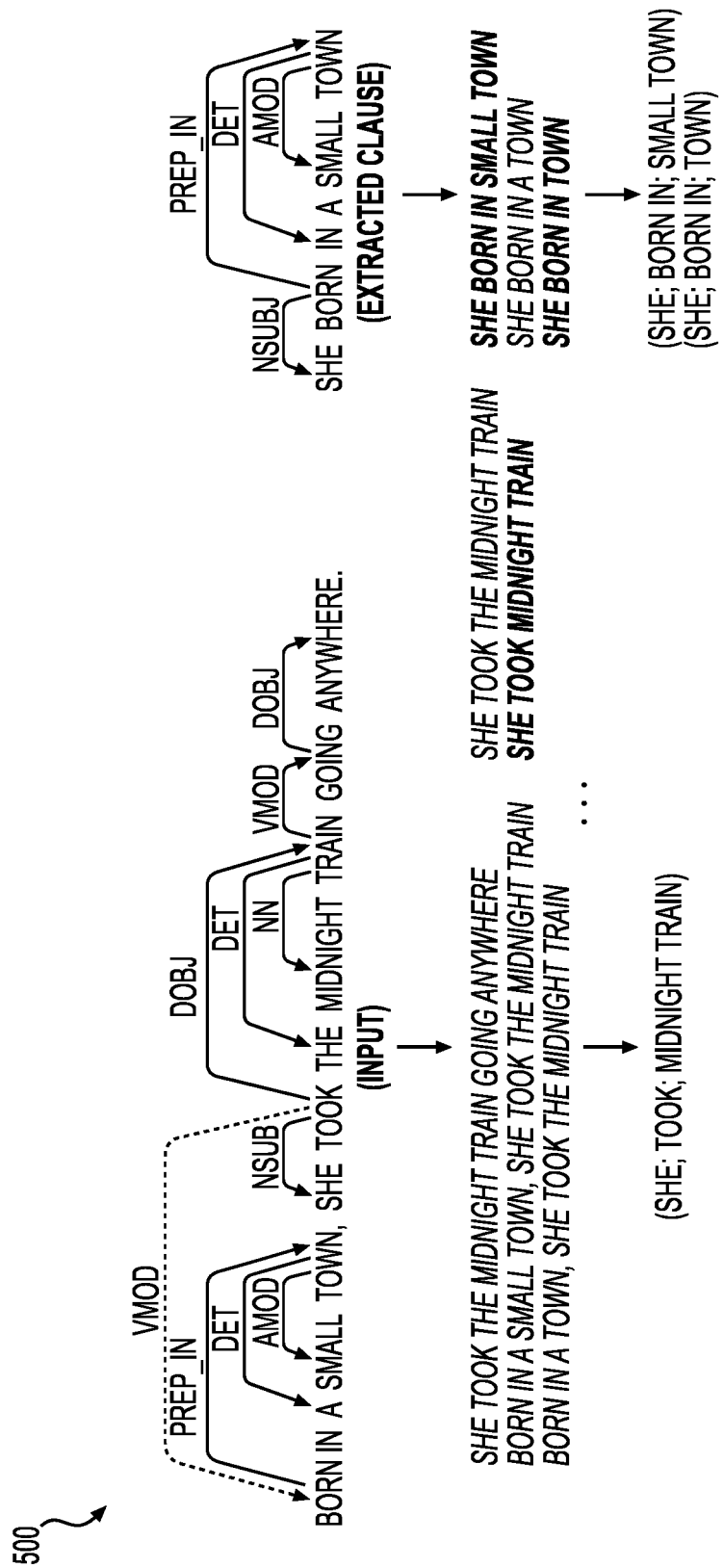
FIG. 5 shows an illustration of Stanford Core-NLP approach according to an example.

FIG. 5 illustrates an example 500 of Stanford Core-NLP, which is a grammar-based open information extraction model that relies on a logistic regression model to extract self-contained clauses from longer sentences. The short self-contained clauses are reduced further by natural logic inference to obtain the maximally specific arguments for each candidate triplet. The final short clauses are segmented to match atomic patterns which convert the clauses into a triplet of the form subject-predicate-object such as "she; took; midnight train" or "she; born in; small town," or "she; born in; town" as illustrated in FIG. 5. The atomic patterns are six simple dependency patterns that represent the majority of triplet extractions. When the substructure of compound nouns is additionally available, five dependency and three TokensRegex surface form are also used to extract triplets as an example, but is not limited to such and other equivalent tools for identifying and acting on patterns in text may be utilized as well.

OpenIE 5.1 combines a coordination analyzer using language mode information extraction (CALMIE) for extraction from conjunctive sentences, bootstrapping for numerical open IE (BONIE) for extraction from numerical sentences, RelNoun for extraction of noun relations, and semantic role labeling IE (SRLIE). CALMIE uses a language model and linguistic constraints to search hierarchical conjunct boundaries, and splits the conjunctive sentences to create simple sentences for traditional open information extraction. BONIE is a relation extractor for sentences that involve numbers, which uses bootstrapping to find dependency patterns for numerical relations in sentences. RelNoun handles the difficult nominal extractions where triplets are mediated by nouns rather than verbs, such as titles and entity attributes. SRLIE uses semantic role labeling (SRL) techniques to supplement traditional shallow syntactic features.

Concerning entity canonicalization (e.g., module 110 in FIG. 1), it is noted that a component of such entity canonicalization is entity linking (See e.g., module 116 in FIG. 1). Entity linking involves mapping entities to existing knowledge graphs/bases such as Wikidata or Freebase. A major drawback of entity linking, however, is that it cannot canonicalize entities that are not covered by existing knowledge graphs or graphing databases, such as in the cases where entities are not popular enough to have corresponding Wikipedia entries. Accordingly, the present pipeline 104 may be configured to build the entity canonicalization based on corpus-wide information for entity canonicalization, rather than leveraging existing knowledge graphs or graphing databases.

Figure 6:
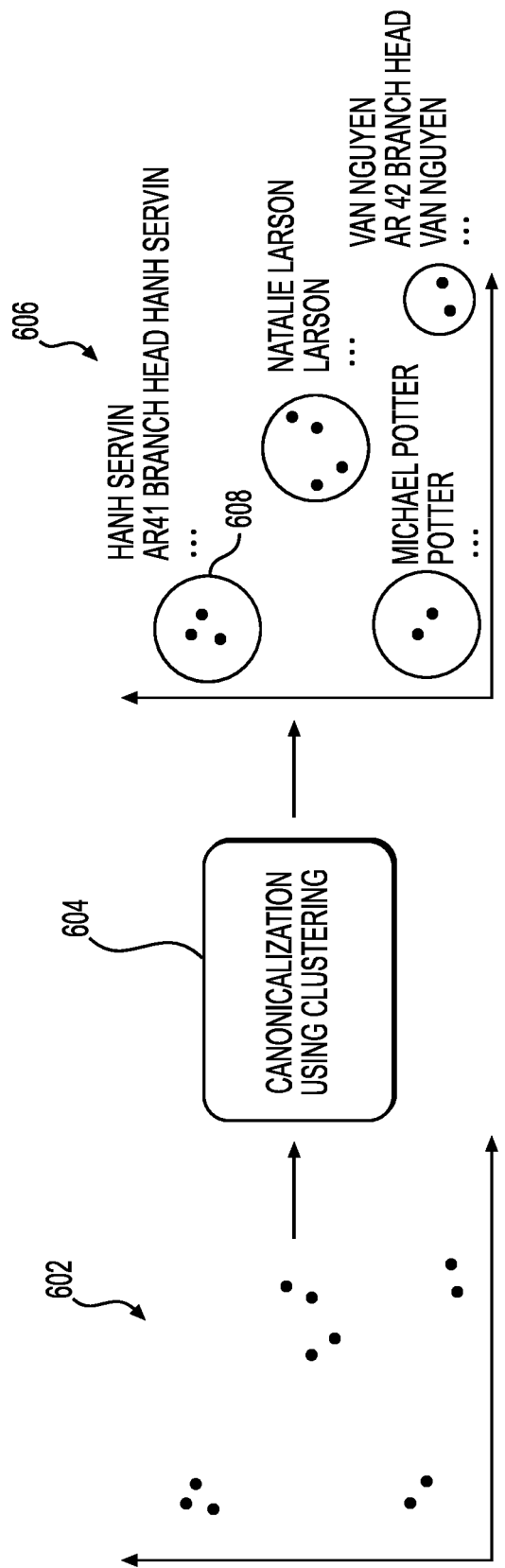
FIG. 6 shows an illustration of Clustering word embeddings/similarity scores with using hierarchical agglomerative clustering (HAC) according to an example.

In particular, it is noted that a mention may be defined as m=(n, u), where n is the subject noun phrase (i.e., entity), and u is an internet address or URL of the document from which the noun phrase originates. Further, the canonicalization module 110 may utilize complete-linkage hierarchical agglomerative clustering (HAC) to identify entity clusters. As an example, FIG. 6 illustrates in graphical form that entities are provided by open information extraction triplets as illustrated at 602, for example. Given a cluster of similar mentions, the canonicalization method (shown by 604) selects a representative noun phrase ñ which is the highest number of different sources of u. Next, ñ replaces all the noun phrases in the corresponding cluster. In the case of a tie between a number of sources, the largest noun phrase is selected as ñ. As shown in FIG. 6, a number of clusters are determined after canonicalization as shown at 606. An exemplary cluster 608 shows that clustering results in a representative noun phrase of "Hanh Servin; AR41 Branch Head Hanh Servin."

Concerning HAC, this clustering may be performed via a number of different similarity metrics such as Mittens Vectors, inverse document frequency (IDF) Token Overlap, and FastText Vectors. It is noted that Mittens and FastText Vectors are learned without human supervision/annotation, which make them suitable for an autonomous or automatic knowledge graph extraction pipeline.

With regard to Mittens vectors, it is noted that these vectors are an extension of GloVe Vectors for domain-specialized representations. Mittens employs a sliding context window that is represented by a center word and the surrounding context words. The main goal is to learn context word vectors $\tilde{w}_i$ based on the center word vector $w_i$. Mittens augments the GloVe Vector extraction loss with an $l_2$ norm, which enforces proximity of learned word embeddings to the existing GloVe Vectors prelearned from Wikipedia 2014 and Gigaword 5 datasets as may be represented by the following relationships:

$$M = W^T \tilde{W} + b1^T + 1\tilde{b}^T - g(X); \quad (9)$$

$$g(X_{ij}) = \begin{cases} k & \text{for } X_{ij} = 0 \\ \log X_{ij} & \text{otherwise} \end{cases}; \text{and} \quad (10)$$

$$J_{Mittens} = f(X)M^T M + \mu \sum_{i \in R} \|w_i - r_i\|^2; \mu \geq 0 \quad (11)$$

Here, $w_i$ and $\tilde{w}_i$ constitute the columns of the matrices W and $\tilde{W}$, respectively, b and $\tilde{b}$ are biases associated with W and $\tilde{W}$, respectively, $g(X_{ij})$ is the log frequency count of word j occurring in the specific context window of word i, $f(X_{ij})$ is a weight that emphasizes word pairs that occur together frequently, $r_i$ are the pre-learned GloVe vectors, and R is the subset of learned words that have corresponding pre-learned embeddings.

Given the learned word vectors, each entity is represented by the average embeddings of the words it contains, denoted by w*. Then, for entities i and j, a similarity score $s_{ij}$ is computed between two entity embeddings by cosine distance as shown by the following relationships:

$$s_{ij} = \frac{w_i^* \cdot w_j^*}{\|w_i^*\|\|w_j^*\|} + 1 \quad (12)$$

where $0 \leq s_{ij} \leq 2$ \quad (13)

With respect to IDF Token Overlap, this metric combines inverse document-frequency (IDF) weights with Jaccard coefficients, such that if two noun phrases share similar words, they are more likely to be similar. By using IDF weights rather than string similarity, a word is given more importance if it appears in fewer mentions as indicated by the following relationships concerning the weights:

$$f_{itol}(m, m') = \frac{\sum_{w \in w(n) \cap w(n')} \log(1 + df(w))^{-1}}{\sum_{w \in w(n) \cup w(n')} \log(1 + df(w))^{-1}}; \quad (14)$$

where $0 \leq f_{itol} \leq 1$ \quad (15)

The value w(·) is the set of words of a noun phrase, and df(w) is the frequency of the word in the collection of all subject and object words appearing in open information extraction triplets.

With regard to FastText Vectors, these vectors are an extension of skip-gram Word2Vec vectors, for which vector embeddings are learned for character n-grams rather than each word. An advantage of learning n-gram character level vector embeddings is that out-of-vocabulary (OOV) words can be expressed as a summation of the n-gram vector embeddings, rather than a special vector representing all OOV words. Similar to Mittens, FastText aims to learn context word vectors based on the center word vector of each context window according to the following relationships:

$$\ell(x) = \log(1 + e^{-x}) \quad (16)$$

$$s(w,c) = \sum_{g \in G_w} z_g^T w_c \quad (17)$$

$$J_{FastText} = \sum_{t=1}^T [\sum_{c \in C_t} \ell(s(w_t, w_c)) + \sum_{n \in N_{t,c}} \ell(-s(w_t, n))] \quad (18)$$

Figure 7:
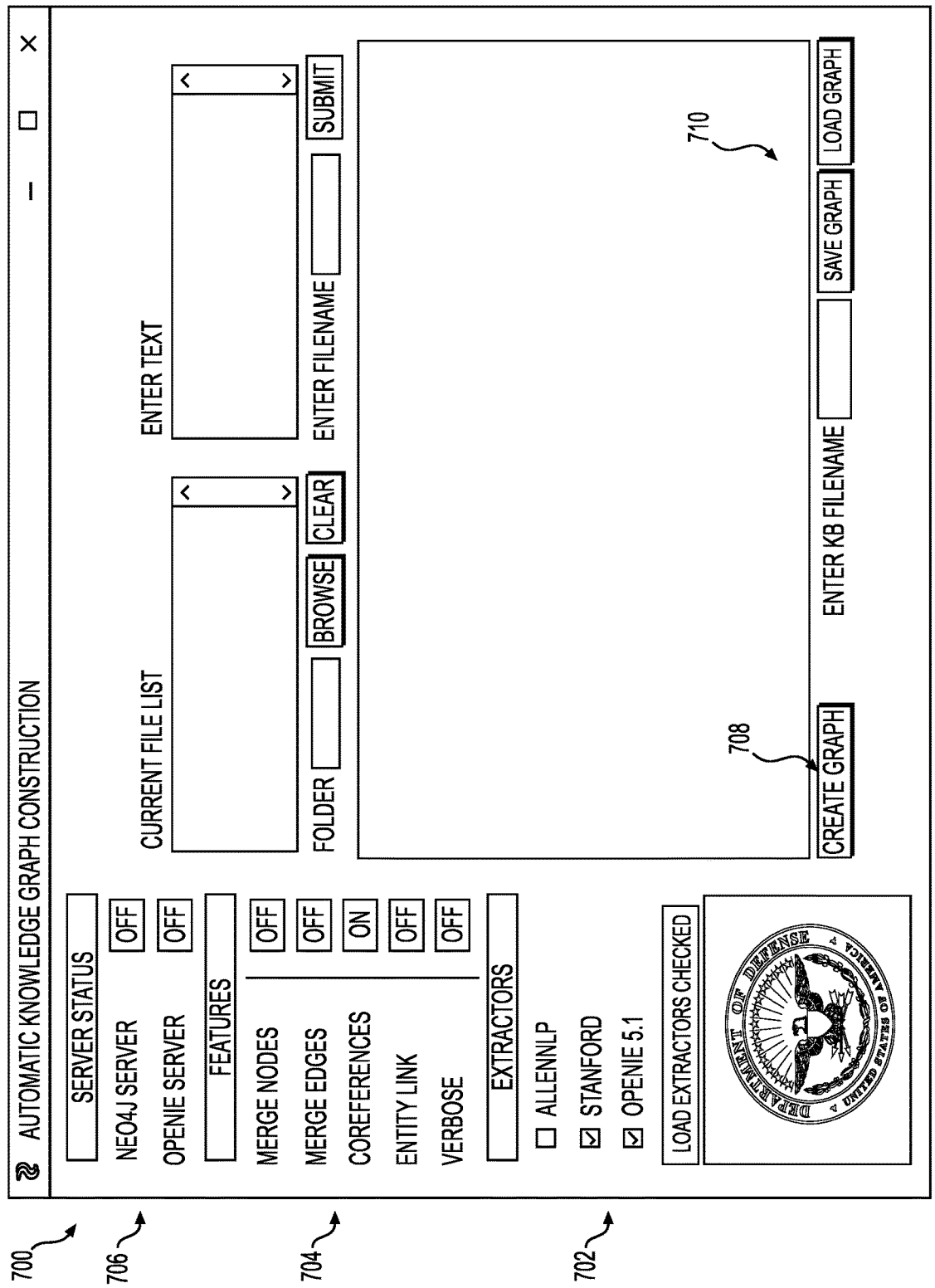
FIG. 7 shows an illustration of an exemplary GUI for control of the pipeline of FIG. 1 according to some aspects.

The value $w_t$ is the center word, n is a randomly sampled word from the vocabulary that does not appear in the context window of $w_t$, and $w_c$ is the context word that is predicted as present (or absent) in context of $w_t$. Given a word, $z_g$ is the n-gram vector embedding and a word is thus represented as a sum of the vector representations of its n-grams. Finally, the similarity between entities is calculated via cosine distance of the learned n-gram representations Pipeline 104 may be implemented with or within a system employing a GUI (or equivalent) that allows users to customize the pipeline 104. FIG. 7 illustrates an example display of the GUI 700. The GUI display 700 allows for, but is not limited to, selection of one or more OIE models as shown at 702. In this example, one or more of the three OIE models discussed above such as RNNOIE, Stanford CoreNLP, and OpenIE 5.1 may be selected, but the OIE models are not limited to such. The user may select any subset or the entire set of the three OIE models discussed above for triplet extraction. Since each model extracts triplets by a different approach, involving more models significantly increases the recall of triplet extraction, but also increases redundancy.

Further, the GUI 700 may provide for control or enabling of pre-processing processes prior to the OIE such as the coreference resolution module 106 as shown at 704. Additionally, the GUI may provide control or enabling of post-processing processes of the OIE output such as the entity canonicalization or entity linking as also shown at 704, viewing server status as shown at 706, generating and/or querying an interactive knowledge graph such as may be seen at 708, and saving/loading constructed knowledge graphs as may be seen at 710.

Figure 8:
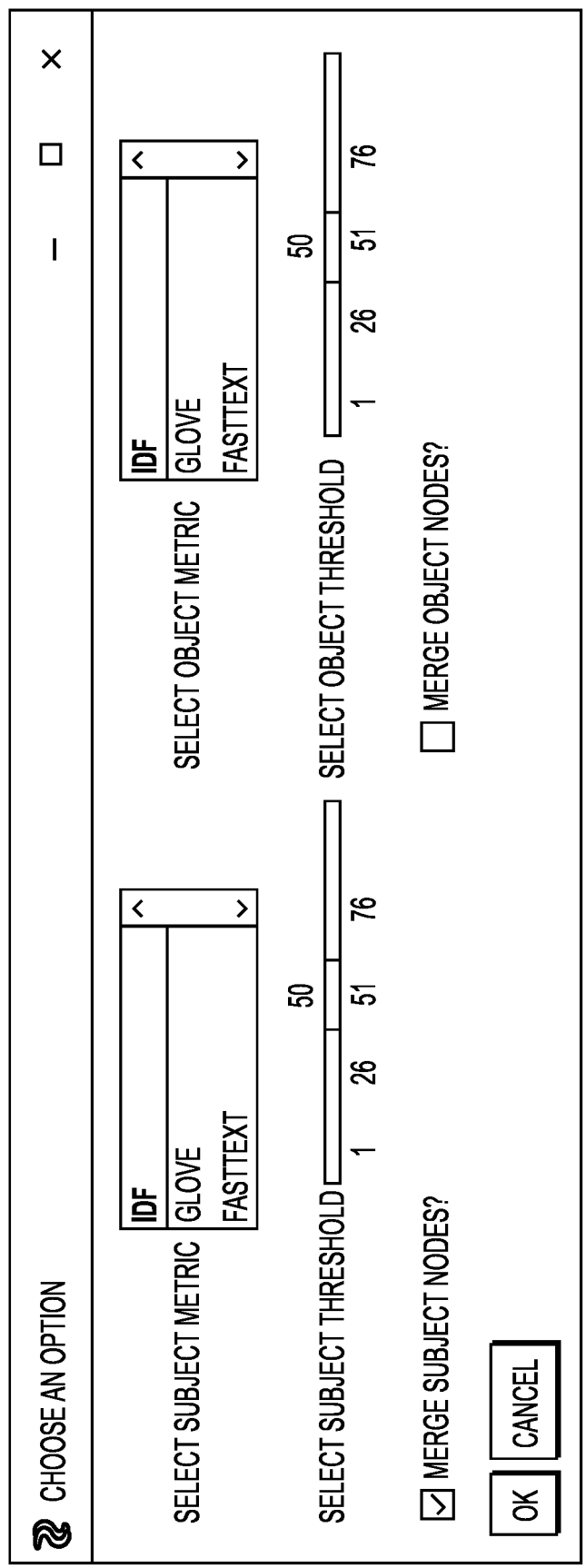
FIG. 8 shows an illustration of an exemplary pop-up display for further control settings using the GUI of FIG. 7.

Of further note concerning when entity canonicalization is enabled, a similarity function (as one of Cosine Distance of Mittens Vectors, IDF Token Overlap, or Cosine Distance of FastText Vectors), as well as a cut-off threshold for a HAC dendrogram to determine the entity clusters must be chosen. An example of this selection is illustrated in FIG. 8 at 800, which may be a pop up window enabled by the GUI and provides for selection of the cut-off thresholds for both objects and subjects, as well as allowing selection of a particular metric and whether to merge object and subject nodes. Moreover, the GUI may allow the user to enable printing OSC logs that present the ingested text files, computations within the enabled features, open information extraction triplets, and a visual of the HAC dendrogram.

In an example, a sample dataset 900 of textual data is shown in FIG. 9. In this example, the sample corpus dataset 900 consists of 15 text files of 1 to 2 sentences each. Sentences include pronoun references, acronyms, n-unary relationships, and different entity mentions of the same entity. After this information is input or ingested by the pipeline 104, a resultant knowledge graph may be generated as is shown in FIG. 10.

Figure 10:
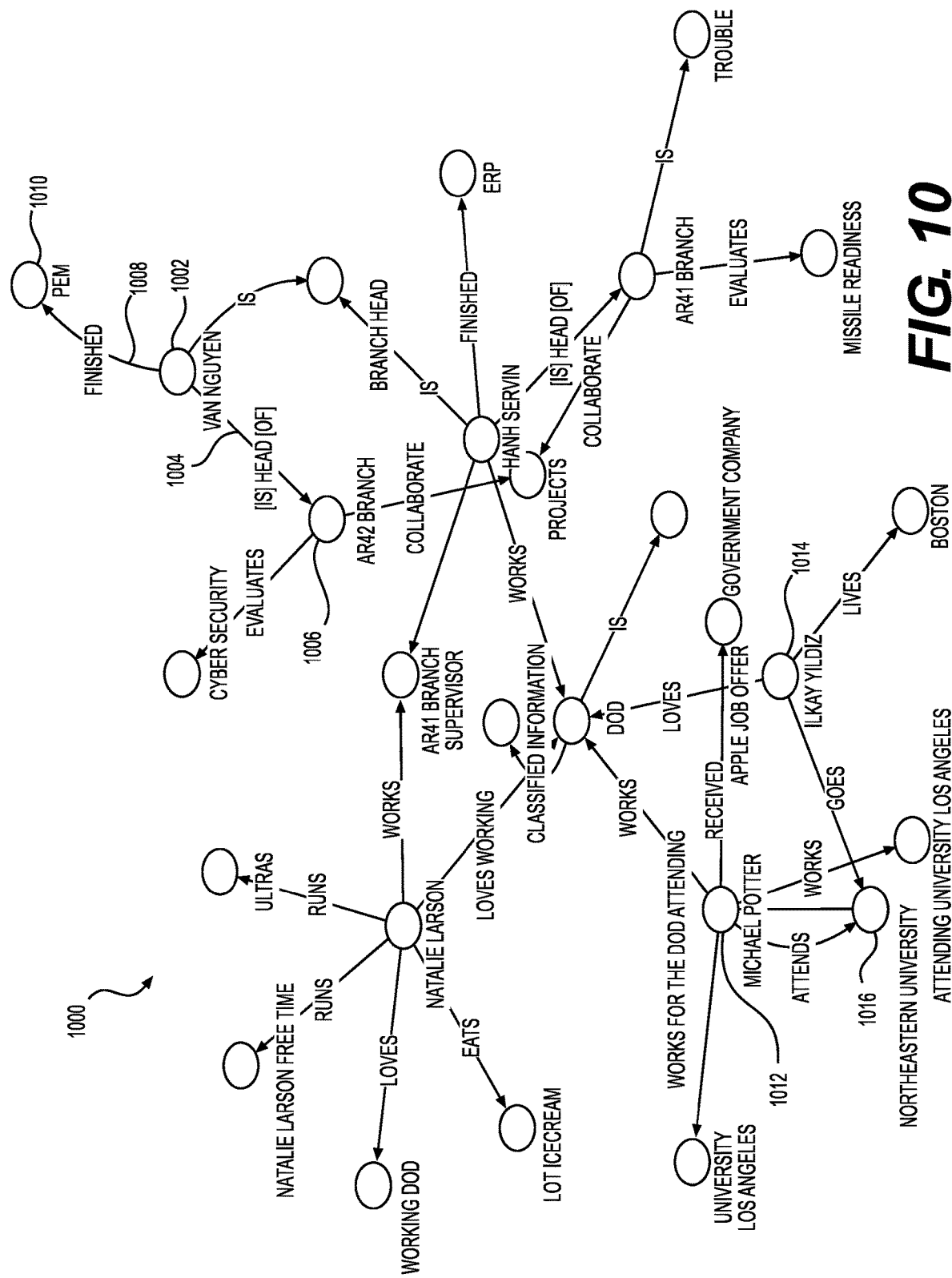
FIG. 10 shows an illustration of an exemplary interactive, web-based knowledge graph generated by the pipeline and GUI based on the corpus of the example of FIG. 9.

As may be seen in FIG. 10, the graph 1000 may be used to determine or reveal salient facts from the sample corpus dataset 900, as well as new information that may be inferred from the connections. For example, if a user were to query "Van Nguyen" via the GUI, the knowledge graph would return that "Van Nguyen" (See e.g., node 1002 that is a subject) is (See e.g., the connection or "edge" 1004 that is a verb) the "AR42 Branch Head" (See e.g., node 1006 that is an object) and finished (See e.g., the edge 1008 that is a verb) "PEM" (See e.g., node 1010 that is an object) based on the current data. Another example demonstrates that, given that "Michael Potter" (Node 1012) and "Ilkay Yildiz" (Node 1014) attended "Northeastern University," (Node 1016), there is a potential relationship that may be inferred between "Michael Potter" and "Ilkay Yildiz" such as colleagues, acquaintances, etc.

After an interactive knowledge graph is created via the pipeline 104, a user may save the knowledge graph for future analysis. In one aspect, when the user saves the knowledge graph, the knowledge graph is written to a Comma Separated Value (CSV) file containing three columns: subject, relationship (e.g., verb or predicate), and object. Each row of the CSV file denotes an extracted subject-predicate-object triplet (or fact). When the user loads a previously saved knowledge graph, the corresponding CSV file representing the knowledge base is ingested to create the interactive knowledge graph, thereby avoiding the need for re-computation of the Open Information Schema construction.

In operation, the disclosed NLP pipeline may have many different use cases. One use case may be used in conjunction with a failure reporting, analysis, and corrective action system (FRACAS) database, which stores relevant information on various system failures. Data captured includes root cause analyses, test equipment, corrective actions, and system build and configuration identified and implemented in a text field format. Currently, an analyst/failure investigator leverages the FRACAS database for creating new trouble reports (TRs) and identifying corrective maintenance actions based on historical records. However, the current procedure requires the analyst/failure investigator to read and comb through years of TRs to find relevant text for generating new TRs with accurate, consistent corrective maintenance actions. Since there is no intelligent information structure of the FRACAS database, the analyst/failure investigator is limited to "CTRL+F" operations for queries.

Constructing a knowledge graph for the FRACAS database enables fast information retrieval and reliable salience determination, which will reduce maintenance time and costs and increase throughput of TRs. With a knowledge graph implemented, a newly opened TR will be related to issues previously seen, allowing investigators to quickly identify similar TRs. Also, the knowledge graph will correct manually inputted misinformation (misspelling, typos, non-standardized nomenclature, etc.) in TR descriptions by canonicalizing information, and will automatically extract critical data fields such as parameter code failures, test dates, failure results, parameter codes values, etc. All the details from individual TRs will be interconnected in the form of a knowledge graph, which will enable the analyst/failure investigator to immediately bring up the raw test data, p-code trends, and analyses related to the TR, failed p-codes, or recurring issues.

Furthermore, information retrieval enables the analyst/failure investigator to query relevant facts. A knowledge graph surpasses a simple word match (e.g., "CTRL+F") result that is limited by exact key term results. One example is if the user queries "tin whisker failures," relevant facts to "tin whisker failures" will appear from the knowledge graph such as common subsystems susceptible to tin whisker failures with specific manufacturer backgrounds. This can help investigators examine TRs in batches and detect general patterns associated with current and historical TRs in their "tin whisker failures" search.

Additionally, the present system provides question-answering capabilities. In particular, question-answering capabilities will enable the analyst/failure investigator to ask questions (queries) and be provided relevant answers from the knowledge graph. Continuing with the tin whisker example from above, if an analyst asks "How many failures have tin whiskers as their root cause?," the knowledge graph will be able to provide an answer reliant on the FRACAS information.

Yet further, the present system can provide salience determination. For example, salience determination enables the analyst/failure investigator to see the most relevant and/or frequent facts from the collection of TRs. A hypothetical situation may involve an analyst who is interested in learning more about a specific guidance system in the FRACAS database. Salience determination will aid the analyst/failure investigator via outputting concise representative information from the FRACAS database such as most associated failures, most recent failures and/or most critical failures.

Still further, the present system can provide misinformation detection. Misinformation detection enables the analyst/failure investigator to see potential inconsistent facts from different TRs within the FRACAS database. This helps bring attention to conflicting reporting between complex systems and their subsystems tracked within the FRACAS database. For example, a component may have one TR report stating that it was uninstalled from system A, while another TR noted on the same day the same subsystem failed an inspection in system B out in the fleet. This discrepancy affects the technical community's understanding of the identity of the subsystem and brings uncertainty about a live system on a ship (e.g., Is the correct subsystem installed? Is there adequate service life on system B? Is there an active Ammunition Information Notice out for the problem subsystem out in the fleet that jeopardizes safety of the crew?).

In yet another aspect, path connections provided by the present pipeline system may enable the analyst/failure investigator to see connections between entities in the TRs. An investigator may search for the connection between "missile variant A" and "missile variant B" when both missile have similar behaving failures. Path connections will indicate that both entities share a component that comes from the same manufacturer lot (e.g., "variant A"→contains "component 1"→part of "variant B").

The presently disclosed pipeline system may further include implementation of BLINK, which is a state of the art BERT-based architecture for large scale zero-shot entity linking, where the only required input information is a short text description for each detected entity. BLINK may be incorporated into the GUI in certain aspects. For predicate linking, known techniques may be used to map predicates from open information extraction to existing relation schemas by maximizing pointwise mutual information values conditioned on type signatures. Determinations made be made when learned entities or relationships are out-of-knowledge base with respect to existing knowledge bases/graphs (also known as nil predictions), for application of more intricate domain data.

Figure 11:
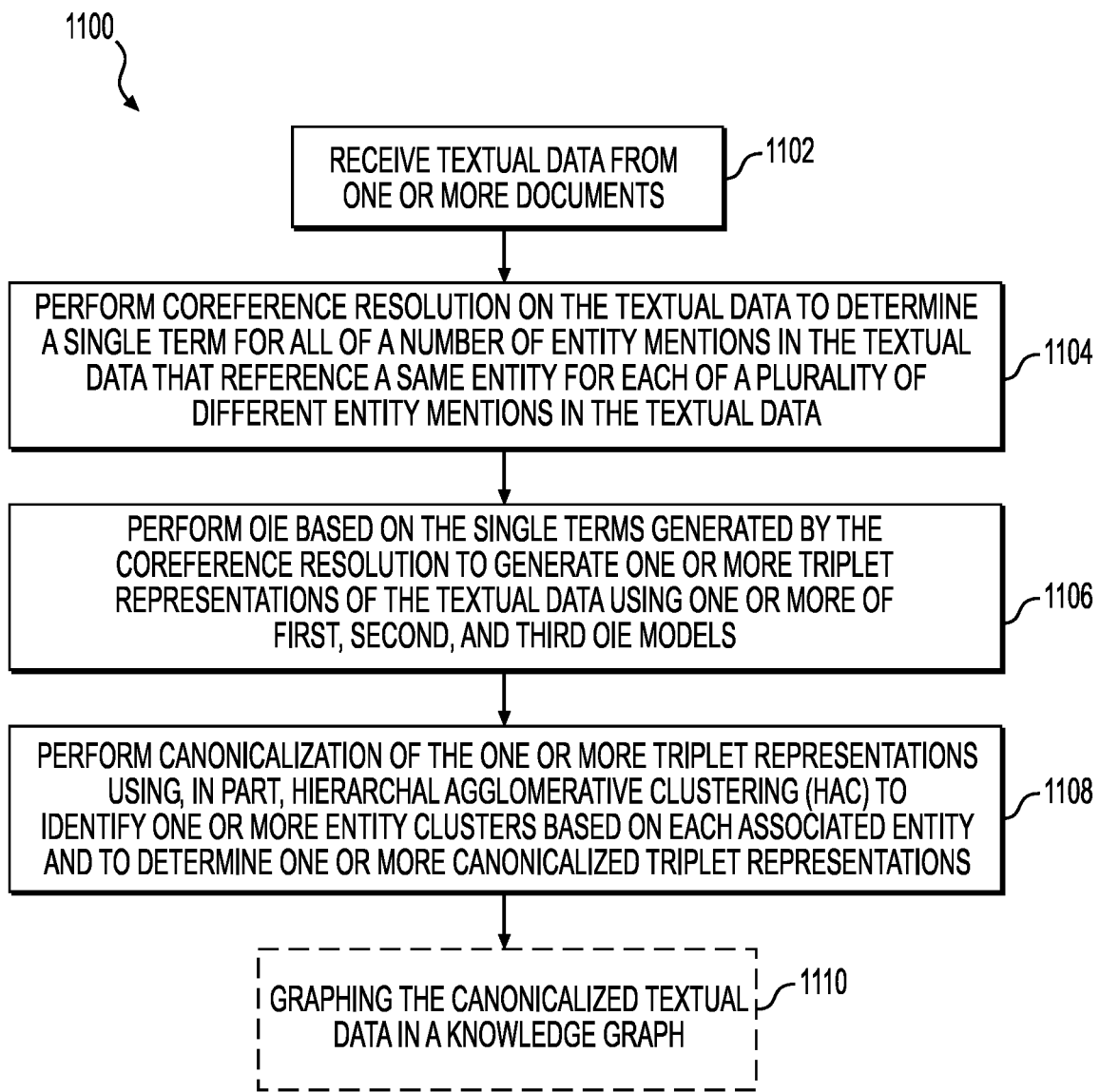
FIG. 11 illustrates a method for processing textual data according to some aspects.

FIG. 11 illustrates a method 1100 for processing textual data, such as with pipeline 104 illustrated in FIG. 1. As illustrated, the method 1100 includes receiving textual data from one or more documents as shown at block 1102. Further, method 1100 includes analyzing the textual data including first performing coreference resolution on the textual data to determine a single term for all of a number of entity mentions in the textual data that reference a same entity for each of a plurality of different entity mentions in the textual data as shown at block 1104.

The analysis of the textual data further includes performing open information extraction (OIE) based on the single terms generated by the coreference resolution to, in turn, generate one or more triplet representations of the textual data using one or more of first, second, and third OIE models, wherein each of the one or more triplet representations is associated with an entity and includes a subject, predicate, and object as shown at block 1106. Moreover, the analysis of the textual data in method 1100 include performing canonicalization of the one or more triplet representations using, in part, hierarchical agglomerative clustering (HAC) to identify one or more entity clusters based on each associated entity and to determine one or more canonicalized triplet representations as shown at block 1108.

In further aspects, method 1100 may include storing and/or mapping the one or more triplet representations in a structured knowledge graph based on the one or more canonicalized triplet representations as shown in block 1110. The structured knowledge graph includes a plurality of nodes and connections between each of the plurality of nodes (i.e., "edges"), wherein each node represents one of the subject or object of a canonicalized triplet representation of the one or more canonicalized triplet representations, and each connection or edge represents a predicate of a canonicalized triplet representation of the one or more canonicalized triplet representations. The method 1100 may further include storing the structured knowledge graph in at least one memory device, wherein the stored structured knowledge graph may be accessed for further analysis without repeating execution of coreference resolution, OIE, and canonicalization.

In still further aspects, method 1100 may include performing coreference resolution on the textual data including removing multiple references to each entity such that the single term is utilized for entity mentions. Further, the coreference resolution on the textual data may include resolving mentions to an entity by conforming all references to the entity with the determined single term. Still further, performing coreference resolution on the textual data may be performed using a bidirectional Long-Short-Term Memory (LSTM) recurrent neural network.

In yet other aspects, method 1100 may include that the first, second, and third OIE models may include one or more of recurrent neural network OIE (RnnOIE) model, a grammar-based OIE model, and OpenIE as discussed before.

Method 1100 may further include that performing canonicalization involves selecting a representative entity name for all subjects and objects that refer to the same entity, and replacing all entity name forms in the entity cluster with the representative entity name.

Still further, method 1100 may include performing coreference resolution that removes references to a same subject or object within a span of words, and performing canonicalization of the one or more triplet representations includes removing references to the same subject or object after the triplets have been determined that performing coreference resolution has not resolved. It is also noted that the HAC may be performed using one of Mittens vectors, IDF Token Overlap, or FastText Vectors. Furthermore, it is noted that method 1100 may include performing canonicalization of the one or more triplet representations to include entity linking wherein at least one triplet representation is linked to an external data source.

Figure 12:
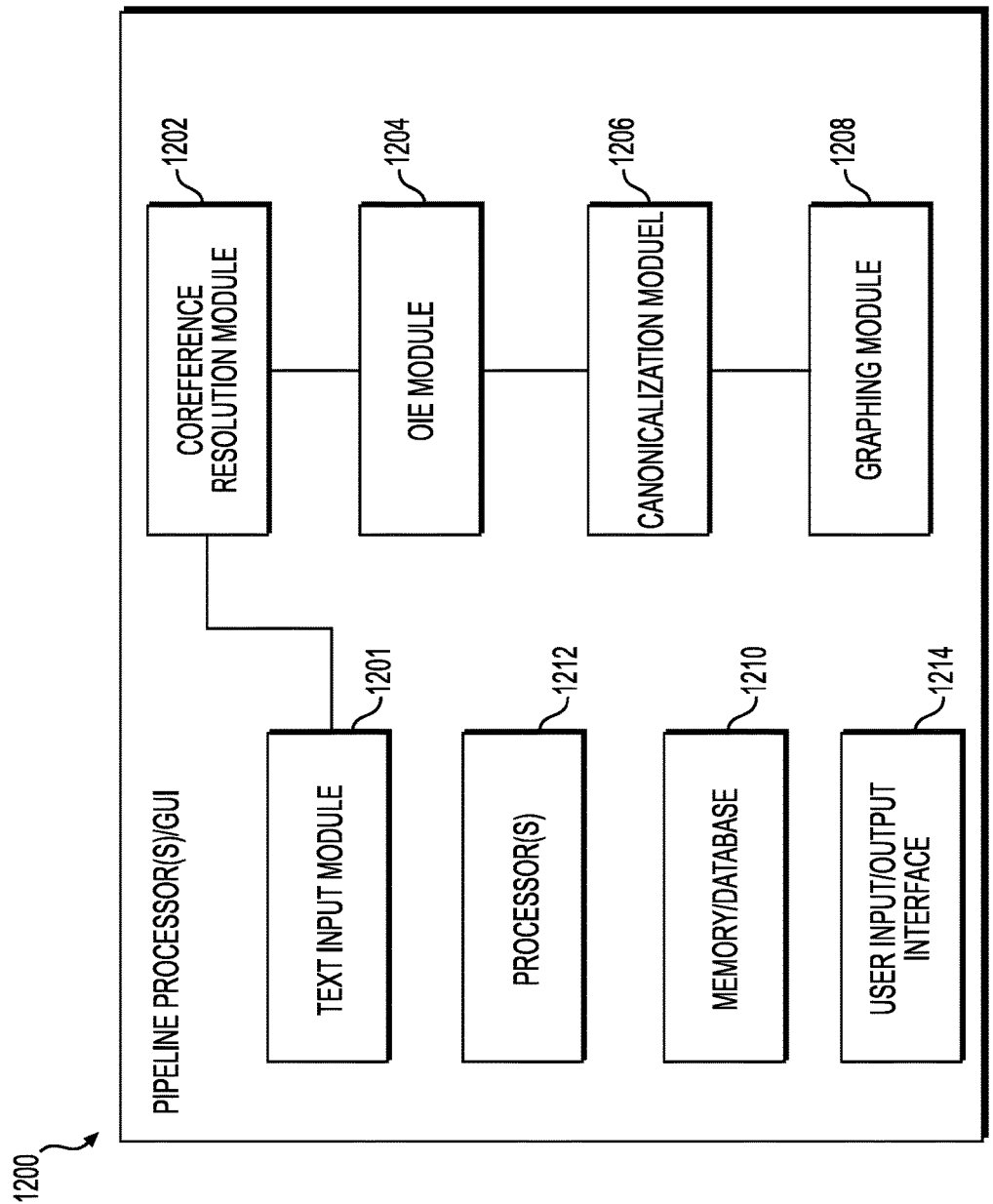
FIG. 12 illustrates an apparatus for processing textual data according to some aspects.

FIG. 12 illustrates an apparatus 1200 for processing textual data according to some aspects. In particular, apparatus 1200 may be configured as an NLP processor and/or GUI that implements a natural language processing pipeline or, alternatively, constitutes an NLP pipeline. In an aspect, the apparatus 1200 includes a textual data input module 1201, which may be implemented by one or more processors including a specialized processor configured to ingest a corpus of textual data from one or more various sources using various means for receiving/collecting/fetching the textual data.

Module 1201 feeds the ingested textual data to a coreference resolution module 1202 that is configured to receive textual data, and perform coreference resolution on the textual data to determine a single term for all of a number of entity mentions in the textual data that reference a same entity for each of a plurality of different entity mentions in the textual data. In one example, module 1202 may be implemented by module 106 in FIG. 1.

The apparatus 1200 further includes an open information extraction (OIE) module 1204 configured to perform OIE based on the single terms generated by the coreference resolution module to generate one or more triplet representations of the textual data using one or more of first, second, and third OIE models, wherein each of the one or more triplet representations is associated with an entity and includes a subject, predicate, and object. In one example, module 1204 may be implemented by module 108 in FIG. 1. Additionally, apparatus 1200 includes a canonicalization module 1206 configured to perform canonicalization of the one or more triplet representations using, in part, hierarchical agglomerative clustering (HAC) to identify one or more entity clusters based on each associated entity and to determine one or more canonicalized triplet representations. In one example, module 1204 may be implemented by module 110 in FIG. 1.

As illustrated, apparatus 1200 may further include a graphing module 1208. This module 1208 is configured to map the one or more triplet representations in a structured knowledge graph based on the one or more canonicalized triplet representations, the structured knowledge graph comprising a plurality of nodes and connections between each of the plurality of nodes, wherein each node represents one of the subject or object of a canonicalized triplet representation of the one or more canonicalized triplet representations, and each connection represents a predicate of the a canonicalized triplet representation of the one or more canonicalized triplet representations. Apparatus 1200 may further include a memory storage device and/or database 1210 configured for storing the structured knowledge graph in at least one memory device, wherein the stored structured knowledge graph may be accessed for further analysis without repeating execution of coreference resolution, OIE, and canonicalization.

In other aspects, apparatus 1200 may include one or more further processors 1214 that implement processes for implementing the method 1100 and communicate with the various modules 1201, 1202, 1204, 1206, and/or 1208, as well as access computer implemented instructions or code that may be stored in memory storage device 1210. Furthermore, it is noted that the modules 1202, 1204, and 1206 may be configured to implement neural networks including deep-learning neural networks, feed forward neural networks (FFNNs), and/or recurrent neural networks including bidirectional Long-Short-Term Memory (LSTM) recurrent neural networks.

In still other aspects, apparatus 1200 may include a user Input/Output interface 1214, which may be part of or in addition to the GUI functionalities described herein. In an aspect, the interface 1214 may implement one or more of the GUI functions described above in connection with FIGS. 7 and 8 as well as the interactive graphing described above in connection with FIG. 10, as an example.

Furthermore, it is noted that code or software for operation of any of the modules described herein may be stored on a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium may reside in the processing systems 100 or 1200, external to the processing systems 100 or 1200, or distributed across multiple entities including the processing systems 100 or 1200. The computer-readable medium may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

One or more of the components, steps, features and/or functions illustrated in FIGS. 1-12 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in any of FIGS. 1-12 may be configured to perform one or more of the methods, features, or steps described herein. Novel algorithms or modules described herein may also be efficiently implemented in software, embedded in hardware, or combinations thereof.

Further, it is to be understood that the specific order or hierarchy of steps in the methods disclosed is an illustration of example processes. Based upon design preferences, it is understood that the specific order or hierarchy of steps in the methods may be rearranged. The accompanying method claims present elements of the various steps in a sample order and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b, and c. All structural and functional equivalents to the elements of the various aspects described throughout this disclosure that are known or later come to be known to those of ordinary skill in the art are expressly incorporated herein by reference and are intended to be encompassed by the following claims.

The invention claimed is:

1. A method for processing textual data, the method comprising:
receiving the textual data from one or more documents;
analyzing the textual data including:
performing coreference resolution on the textual data to determine a single term for all of a number of entity mentions in the textual data that reference a same entity, wherein the coreference resolution is performed in such manner for each of a plurality of different entities in the textual data to produce a plurality of single terms, each of which corresponds to a respective entity of the plurality of different entities;
performing open information extraction (OIE) based on each of the plurality of single terms generated by the coreference resolution to, in turn, generate one or more triplet representations of the textual data using one or more of first, second, and third OIE models, wherein each of the one or more triplet representations is associated with an entity and includes a subject, predicate, and object;
linking noun phrases of one or more of the plurality of different entities to external sources to achieve one or more respective linked entities;

performing canonicalization of the one or more triplet representations using, in part, hierarchical agglomerative clustering (HAC) to identify one or more entity clusters based on each associated entity and the one or more linked entities, and to determine one or more canonicalized triplet representations, wherein performing canonicalization further comprises selecting a representative entity name for all subjects and objects that refer to the same entity; and replacing all entity name forms in the entity cluster with the representative entity name; and mapping the one or more triplet representations into a structured knowledge graph, storing the structured knowledge graph in at least one memory device, based on the one or more canonicalized triplet representations for display in a graphical user interface, the structured knowledge graph comprising a plurality of nodes and connections between each of the plurality of nodes, wherein each node represents one of the subject or object of a canonicalized triplet representation of the one or more canonicalized triplet representations, and each connection represents a predicate of a canonicalized triplet representation of the one or more canonicalized triplet representations.

2. The method of claim 1, further comprising storing the structured knowledge graph in the at least one memory device, wherein the stored structured knowledge graph may be accessed for further analysis without repeating execution of coreference resolution, OIE, and canonicalization.

3. The method of claim 1, wherein performing coreference resolution on the textual data includes removing multiple references to each entity such that the single term is utilized for entity mentions.

4. The method of claim 1, wherein performing coreference resolution on the textual data includes resolving mentions to an entity by conforming all references to the entity with the determined single term.

5. The method of claim 1, wherein performing coreference resolution on the textual data is performed using a bidirectional Long-Short-Term Memory (LSTM) recurrent neural network.

6. The method of claim 1, wherein the first, second, and third OIE models includes one or more of recurrent neural network OIE (RnnOIE) model, a grammar-based OIE model, and OpenIE.

7. The method of claim 1, wherein the HAC is performed using one of Mittens vectors, IDF Token Overlap, or FastText Vectors.

8. The method of claim 1, wherein performing canonicalization of the one or more triplet representations includes entity linking wherein at least one triplet representation is linked to an external data source.

9. A natural language processing (NLP) pipeline apparatus, comprising:
at least one or more processors;
a textual data input module configured to receive textual data;
a coreference resolution module configured to receive textual data, and perform coreference resolution on the textual data to determine a single term for all of a number of entity mentions in the textual data that reference a same entity, wherein the coreference resolution is performed in such manner for each of a plurality of different entities in the textual data to produce a plurality of single terms, each of which correspond to a respective entity of the plurality of different entities;

an open information extraction (OIE) module configured to perform OIE based on the single terms generated by the coreference resolution module to generate one or more triplet representations of the textual data using one or more of first, second, and third OIE models, wherein each of the one or more triplet representations is associated with an entity and includes a subject, predicate, and object;

a canonicalization module configured to link noun phrases of one or more of the plurality of different entities to external sources to achieve one or more respective linked entities, and to perform canonicalization of the one or more triplet representations using, in part, hierarchical agglomerative clustering (HAC) to identify one or more entity clusters based on each associated entity and the one or more linked entities, and to determine one or more canonicalized triplet representations, wherein the canonicalization module is further configured to select a representative entity name for all subjects and objects that refer to the same entity, and replace all entity name forms in the entity cluster with the representative entity name; and a graphing module configured to map the one or more triplet representations in a structured knowledge graph based on the one or more canonicalized triplet representations for display in a graphical user interface, the structured knowledge graph comprising a plurality of nodes and connections between each of the plurality of nodes, wherein each node represents one of the subject or object of a canonicalized triplet representation of the one or more canonicalized triplet representations, and each connection represents a predicate of a canonicalized triplet representation of the one or more canonicalized triplet representations.

10. The pipeline of claim 9, further comprising a memory storage device configured for storing the structured knowledge graph in at least one memory device, wherein the stored structured knowledge graph may be accessed for further analysis without repeating execution of coreference resolution, OIE, and canonicalization.

11. The pipeline of claim 9, wherein the coreference resolution module is further configured to perform coreference resolution on the textual data including removing multiple references to each entity such that the single term is utilized for entity mentions.

12. The pipeline of claim 9, wherein the coreference resolution module is further configured to perform coreference resolution on the textual data including resolving mentions to an entity by conforming all references to the entity with the determined single term.

13. The pipeline of claim 9, wherein the coreference resolution module includes a bidirectional Long-Short-Term Memory (LSTM) recurrent neural network.

14. The pipeline of claim 9, wherein the first, second, and third OIE models includes one or more of recurrent neural network OIE (RnnOIE) model, a grammar-based OIE model, and OpenIE.

* * * * *